Patented Nov. 26, 1929

1,737,132

UNITED STATES PATENT OFFICE

WILLIAM R. VEAZEY, OF CLEVELAND HEIGHTS, OHIO, ASSIGNOR TO THE DOW CHEMICAL COMPANY, OF MIDLAND, MICHIGAN, A CORPORATION OF MICHIGAN

INSECTICIDAL COMPOSITION

No Drawing.   Application filed February 21, 1923.   Serial No. 620,498.

The present invention relates more particularly to the improvement of the so-called arsenicals, specifically the arsenates for use in insecticidal compositions. Of such arsenates, lead arsenate is not only typical but practically the only one that has heretofore been used on any extensive commercial scale. It is well known that both the ortho-arsenate, $Pb_3(AsO_4)_2$, and the acid-arsenate, $PbHAsO_4$, together with the intermediate substance which may be regarded either as a true chemical compound or as a mixture of the foregoing ortho- and acid-arsenates, constitute a very efficacious insecticide for combating many forms of insect pests. Calcium arsenate and magnesium arsenate have more recently been prepared for insecticidal use, but the former is principally applied in dry powdered form, e. g. in combating the boll weevil.

In the case of such lead arsenate it has been found a matter of some difficulty to prepare the same in a powdered form that will retain the desirable slow settling quality of the freshly precipitated or paste product, and even in the case of the latter, it has become the practice to add a small percentage of some other neutral substance that will act as a deflocculator, i. e. reduce the arsenate to a non-settling colloidal state when the product is mixed with water. Whether due to such state of the arsenate or to the presence of the added substance, the effect of the latter is not only to render the product extremely slow settling in character, when thus admixed with water, but also improves the spreading and adhesive qualities of such product when applied to plants and foliage. For this reason materials added for the purpose stated are sometimes called "spreaders" (see Oregon Agricultural College Experiment Station Bulletin 169, "Insecticidal Investigations" by A. L. Lovett, April, 1920). Among the substances that have been heretofore found efficient as deflocculators or spreaders may be named soap bark or saponin, gelatin, glue, gum arabic and calcium caseinate, all of which may be defined as relatively chemically inert colloids of organic origin. I am also aware that it has been proposed to add to the arsenate, for the purpose in question, a small amount of desugared molasses and the residual digester liquor from paper making processes, the essential ingredients in which are undoubtedly of the same description as those designated as above as inert colloids of organic origin.

In any event, all of such known deflocculators act merely as protective colloids and the use of the same deflocculators has been known for a long time as a means for preventing the settling of many insoluble compounds; thus, specifically referring to gum arabic solution, see article by Lefort & Thibault, Jour. Chem. Soc., 42, 1322 (1882). I have now discovered that another class of substances, equally available to the manufacturer, is if anything better adapted for use in thus deflocculating insoluble arsenicals, such as lead arsenate and the like, which are employed as insecticides. The substances in question instead of acting as protective colloids are substances capable of forming negative ions in the solution which are thereupon adapted to be adsorbed by the lead arsenate, the particles of which are accordingly rendered mutually repellant. In this way such particles, instead of tending to agglomerate or "flock", are maintained in dispersed condition in the solution or liquid vehicle and if such particles be sufficiently fine, they will settle only very slowly; in other words, in this way all the advantages accruing from the use of a protective colloid are obtained.

To the accomplishment of the foregoing and related objects, the invention, then, consists of the novel composition of matter and the step or steps hereinafter described, it being understood, however, both as to the ingredients employed in such composition and as to such stated method of manufacture, that changes may be made therein without departing from the spirit of the invention.

Referring specifically to the manufacture of lead arsenate, it is unnecessary to explain that whatever the chemical formula of such arsenate, the latter is precipitated initially in the form of a paste and that in order to form a powder from such precipitate it is necessary after drying the same to disintegrate the resulting product by the use of a pulverizing machine, a disintegrator of the type in which stationary and revolving diaphragms are employed being preferable to an ordinary mill, since the tendency of the latter is to compact the particles of arsenate and so cause the dry product thus prepared to settle more rapidly than the original product from which it is made when admixed with water.

Whether the lead arsenate is to be left in paste form or is to be thus reduced to a powder, I preferably add my improved deflocculator to such paste, either before or after it has settled out, by thoroughly mixing the two together. Satisfactory results, however, may be secured where the arsenate is subsequently dried and reduced to a powder by grinding the deflocculator with the arsenate or by intermixing the same subsequently, i. e. directly with the powdered arsenate.

As hereinbefore indicated, I use as such deflocculator a substance or compound that is capable of forming negative ions in the solution, which ions are thereupon adapted to be adsorbed by the lead arsenate. The substance selected is preferably one that will form ions having a valence of three or more in order effectively to serve the purpose in connection with the arsenical compounds under consideration. Such substance or compound is preferably a neutral, inorganic salt, although as will be pointed out certain organic salts will serve the purpose. Thus I have found that a satisfactory dispersive effect is secured by such formation of negative ions and their adsorption by the particles of lead arsenate when a small percentage (approximately 1 per cent by weight, dry) of any of the following salts is added, viz, an alkali-metal arsenate, (e. g. ammonium, sodium or potassium arsenate); an alkali-metal phosphate; ammonium citrate; as well as the so-called stable double cyanides. Of the latter, specific mention may be made of ferro-, ferri-, nickelo-, nickeli-, cobalto-, chromo-, chromi-, and platino-cyanide; although in general any double cyanide of a heavy metal will have a measurable effect as a deflocculator due to the ionizing and adsorptive action described above.

By way of still more specific example, I have found that the addition of 1 per cent of potassium ferrocyanide, $K_4Fe(Cn)_6$, to dry lead arsenate acts as an efficient deflocculator or suspension aid; indeed such action is fully as efficient as that of gum arabic. The following test may be cited in support of the foregoing, viz:—The addition material, consisting as stated of 1 per cent of potassium ferrocyanide by weight, dry, is shaken up with the dry powdered arsenate or the two are ground together dry. Then 2 g. of such mixture are taken, added to and thoroughly intermixed with 100 cc. of water and put in a suitably graduated, e. g. Nessler tube. Thereupon the upper half of the watery mixture, amounting to 50 cc., is removed preferably by an automatic pipette, so as to avoid any stirring effect, and the quantity of arsenate mixture in such half is ascertained by evaporating off the water and weighing the dry residuum. Obviously if no settling has occurred and the solid material is at the start uniformly disseminated, 1 gram should be found in the half of the batch thus removed. As a matter of fact, the following results have been noted, viz:—At the end of 1 minute of standing, from 85 to 90 per cent of the arsenate mixture remained suspended; at the end of 5 minutes, from 80 to 85 per cent; at at the end of 15 minutes, from 75 to 80 per cent; at the end of 30 minutes, from 65 to 70 per cent; and at the end of 1 hour, from 55 to 60 per cent.

Upon duplicating the foregoing test but substituting gum arabic in like amount, i. e. 1 per cent, no better results are noted. I have also found that upon increasing the amount of such potassium ferrocyanide from 1 per cent to 2 per cent, the suspension, as indicated by the foregoing test, is not materially improved, if at all, and here again the results are closely paralleled where 2 per cent of gum arabic is substituted. I have also found that by taking ½ per cent of potassium ferrocyanide and ½ per cent of gum arabic together, the suspension of the arsenate mixture is practically the same as where 1 per cent of such ferrocyanide is employed. If only ½ per cent of the ferrocyanide by itself is employed, the results are not as good, as indicated by the foregoing figures, and yet a very appreciable deflocculating action is apparent,—the results being more than one-half as good as where 1 per cent is thus employed.

The action, however, so far as retaining the lead arsenate in suspension is concerned, is equally as good as that first described above where to the potassium ferrocyanide another insoluble or less soluble ferrocyanide is added, as for example zinc ferrocyanide, provided the potassium ferrocyanide remains in excess. Thus I have added 1½ per cent of potassium ferrocyanide along with ½ per cent of zinc sulphate, the latter of course combining with a corresponding amount of such ferrocyanide. The result here is substantially the same as where 1 or 2 per cent of the potassium ferrocyanide alone is employed. Instead of zinc sulphate being thus combined with an excess of potassium ferrocyanide, I may add in like amount either lead acetate, copper sulphate and iron sulphate (ferrous or ferric). A noticeable effect is produced where all of the potassium ferrocyanide is converted into one of the other less soluble ferrocyanides just referred to, e. g. zinc ferrocyanide, although not so good as where the potassium ferrocyanide is in excess.

It will be understood of course that for the purpose in hand any of the alkali metal ferrocyanides, e. g. sodium or ammonium ferrocyanide, will be interchangeable with the potassium ferrocyanide specifically referred to above; and in general the effect on the settling action of the lead arsenate is improved by the addition in relatively small amount (approximately 1 per cent) of any soluble or partially soluble ferrocyanide, including, in addition to the foregoing, specifically the alkali earth metal ferrocyanides.

The use of such a ferrocyanide and specifically an alkali metal ferrocyanide is found perceptibly to increase the adhesive character of the resulting mixture, which is found to stick in a surprising manner even to a glass surface. At the same time, due to the uniform dissemination of the lead arsenate particles throughout the watery vehicle, an improved spreading effect, using such term in its narrow sense, will result.

The degree to which any of the foregoing substances, and particularly such a stable double cyanide of a heavy metal, functions by virtue of the adsorption of the negative ferrocyanide ion by the particles of lead arsenate, thus charging the latter negatively, will depend upon the solubility of such substance. Thus, the best results have been secured, as noted, where potassium ferrocyanide is employed. However, even in such case the potassium ferrocyanide will presumably re-act with the lead arsenate to form a certain amount of lead ferrocyanide which serves as a protective colloid, and where a less soluble ferrocyanide is introduced, as for example zinc ferrocyanide, the latter may similarly function in a dual capacity, viz, directly as a protective colloid and indirectly to the extent that it goes into solution by forming negative ions that are capable of being adsorbed by the particles of lead arsenate.

In addition to the deflocculating action which the class of substances defined above are found to have on insoluble arsenicals, such as are used for insecticides, I have found that such substances, (and this is particularly true of the ferrocyanides), facilitate the grinding of the arsenical if added thereto in the course of its preparation. In other words, lead arsenate particles, for example, are much more readily comminuted and reduced to the form of an extremely fine impalpable powder without showing a tendency to agglomerate or stick together, where such ferrocyanide is added to the lead arsenate previously to the drying and such grinding thereof.

It has already been made clear that my improved defloculator may be advantageously employed, substantially as hereinbefore described with arsenates, other than lead arsenate, used as insecticides, namely calcium and magnesium arsenates. The same is true of other insoluble arsenicals, such as Paris green.

I have already referred to certain ammonium ($NH_4$) compounds as being the equivalent, for the purpose in hand, of corresponding alkali-metal salts, and in the absence of a better inclusive designation, it will be understood that when alkali-metal ferrocyanides, or the like, are specified herein, the corresponding ammonium salts are intended to be comprehended also. Furthermore, instead of such ammonium salts, those of substituted ammonium compounds of an organic nature, i. e. those in which one or more of the hydrogen atoms of the $NH_4$ group have been replaced by an organic radical, may be employed with the same effect, and such substituted ammonium compounds will be understood as likewise comprehended by the foregoing term.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. A composition of matter for insecticidal use comprising a substantially insoluble arsenical and a relatively small amount of a stable double cyanide of a metal of the iron group.

2. A composition of matter for insecticidal use comprising a substantially insoluble arsenical and a relatively small quantity of an iron cyanogen compound.

3. A composition of matter for insecticidal use comprising a substantially insoluble arsenical and a relatively small quantity of a soluble ferrocyanide.

4. A composition of matter for insecticidal use comprising a substantially insoluble arsenical and a relatively small quantity of an alkali-metal ferrocyanide.

5. A composition of matter for insecticidal use comprising a substantially insoluble arsenical and a relatively small quantity of a mixture of soluble and insoluble ferrocyanides.

6. A composition of matter for insecticidal use comprising a substantially insoluble arsenical and a relatively small quantity of a mixture of soluble and insoluble ferrocyanides, the former being in excess of the latter.

7. A composition of matter for insecticidal use comprising a substantially insoluble arsenical and a relatively small quantity of a mixture of alkali metal and zinc ferrocyanides, the former being in excess of the latter.

8. A composition of matter for insecticidal use comprising lead arsenate, and from approximately one-half to two per cent by weight of an iron cyanogen compound.

9. A composition of matter for insecticidal use comprising lead arsenate, and from approximately one-half to two per cent by weight of a soluble ferrocyanide.

10. A composition of matter for insecticidal use comprising lead arsenate, and from approximately one-half to two per cent by weight of a mixture of soluble and insoluble ferrocyanides.

11. A composition of matter for insecticidal use comprising lead arsenate, and approximately one per cent by weight of a mixture of an alkali-metal ferrocyanide and a relatively insoluble ferrocyanide.

12. A composition of matter for insecticidal use comprising lead arsenate, and approximately one per cent by weight of a mixture of potassium and zinc ferrocyanides.

13. A composition of matter for insecticidal use comprising lead arsenate, and approximately one per cent by weight of a mixture of an alkali-metal ferrocyanide and a relatively insoluble ferrocyanide, the former being slightly in excess of the latter.

Signed by me, this 19th day of February, 1923.

WILLIAM R. VEAZEY.